United States Patent [19]

Freeman et al.

[11] 4,102,835

[45] Jul. 25, 1978

[54] HIGH STRENGTH ADHESIVES, FILMS AND COATINGS

[75] Inventors: Charles R. Freeman, Lincoln Township, Washington County; Charlotte I. Sauer, Oakdale, both of Minn.

[73] Assignee: Minnesota Mining and Manufacturing Company, Saint Paul, Minn.

[21] Appl. No.: 653,385

[22] Filed: Jan. 29, 1976

Related U.S. Application Data

[63] Continuation of Ser. No. 172,590, Aug. 17, 1971, abandoned, Continuation-in-part of Ser. No. 856,145, Sep. 8, 1969, abandoned, which is a continuation of Ser. No. 592,268, Nov. 7, 1966, abandoned.

[51] Int. Cl.$^2$ .......................... C08L 7/00; C08L 53/02
[52] U.S. Cl. .................................. 260/5; 260/27 BB; 260/829; 260/845; 260/846; 260/876 B; 427/207 B
[58] Field of Search ..................... 260/5, 876 B, 27 BB

[56] References Cited

U.S. PATENT DOCUMENTS

| | | | |
|---|---|---|---|
| 2,410,079 | 10/1946 | Kellgren | 260/793 |
| 2,925,174 | 2/1960 | Stow | 428/346 |
| 3,231,635 | 1/1966 | Holden et al. | 260/880 |
| 3,242,110 | 3/1966 | Korpman | 260/5 |
| 3,265,765 | 8/1966 | Holden et al. | 260/876 |
| 3,322,856 | 5/1967 | Holden et al. | 260/876 |

FOREIGN PATENT DOCUMENTS 6,405,713  11/1964  Netherlands.
1,033,133  6/1966  United Kingdom.

*Primary Examiner*—John C. Bleutge
*Attorney, Agent, or Firm*—Cruzan Alexander; Donald M. Sell; Warren R. Bovee

[57] ABSTRACT

A pressure-sensitive adhesive having greatly improved physical strength is provided by adding 5 to 30 parts by weight of a block copolymer of the type - A - B - A - to 100 parts by weight of a conventional tacky viscoelastic pressure-sensitive adhesive. The resulting reinforced adhesive can be used in sheet form as a transfer adhesive without fibrous reinforcement or where a high strength adhesive is desired.

6 Claims, No Drawings

HIGH STRENGTH ADHESIVES, FILMS AND COATINGS

This is a continuation, of application Ser. No. 172,590 filed Aug. 17, 1971, now abandoned.

This application is a continuation-in-part of our copending application Ser. No. 856,145, filed Sept. 8, 1969, now abandoned which is a continuation of U.S. Ser. No. 592,268, filed Nov. 7, 1966, now abandoned.

FIELD OF THE INVENTION

This invention relates to novel pressure-sensitive adhesive compositions and to coatings, films, or transfer adhesives formed therefrom, containing a polymeric additive which internally reinforces the adhesive in a manner much superior to the usual fibrous reinforcement, greatly increasing the shear strength, tensile strength, and tear resistance of the adhesives.

Pressure-sensitive transfer adhesives are pressure sensitive adhesives in the form of self-supporting films which are generally provided on release liners, as for example, polyethylene film or a paper coated with a silicone or other release agent from which the films can be readily stripped. The transfer adhesive is commercially supplied in roll form and should be capable of being unwound without any offsetting of adhesive at the edges or elsewhere. After application of the transfer adhesive to the desired substrate, the liner is pealed off to expose the adhesive film, permitting the adherence thereto of another sheet material or application to another substrate, for example, in laminating applications. One use of such transfer adhesive is in forming "sandwich type" laminated electrical conductors or the like, in which case an adhesive having suitable electrical properties is selected.

Another use for such transfer adhesives is a means whereby a converter may apply an adhesive and liner to a backing, such as a metal foil ribbon (which may, for example, have a label insignia imprinted on the reverse surface thereof). The ultimate user of the laminated product then removes the liner at the time of use to expose the pressure-sensitive adhesive, permitting the foil to be adhered to a desired substrate in a dry manner by mere contact and light pressure.

DESCRIPTION OF THE PRIOR ART

To provide pressure-sensitive adhesive films having sufficient integrity to be handled and used as transfer adhesives, reinforcing fiber fillers have generally been added to the adhesive as taught in Kalleberg et al U.S. Pat. No. 3,062,683 issued Nov. 6, 1962. Such fibers, however, tend to cause clumping and difficulty in coating the adhesive, have discrete size which is large when compared with the adhesive molecules, and have a tendency to decrease the adhesive properties, particularly the aggressively tacky nature thereof, since the fibers themselves do not provide adhesive properties. The adhesives thus reinforced are necessarily rather thick to accommodate the fiber thickness and still provide a fairly uniform adhesive coating. The processing of such compositions, particularly the mixing in and coating of the fibers with the adhesive is also carried out only with difficulty. The fiber-reinforced formulations do not readily conform to, and thus do not adhere well to irregular surfaces.

Block copolymers have been proposed as a rubbery material from which pressure-sensitive adhesive (PSA) formulations can be prepared. See, for example, U.S. Pat. No. 3,239,478 (Harlan, Jr.) issued Mar. 8, 1966. The PSA's prepared from the block copolymers using conventional tackifiers (wherein the block copolymer is the major elastomeric component) tend to be stiff and not suitable where aggressively tacky pressure-sensitive adhesives are desired and thus it has been necessary, in formulating these prior art PSA's, to add plasticizers such as the oil added by Harlan, Jr. These oil-plasticized PSA's are thermoplastic in nature; they soften at moderately elevated temperatures (i.e., 90° C.), are low in strength, have poor solvent resistance and poor adhesion when applied at low temperatures.

It has been recognized that A - B - A block copolymers of the type disclosed in the aforementioned Harlan, Jr. patent can be blended with "green" (i.e., unvulcanized) elastomers such as high-cis polyisoprene to improve their "green" strength. See U.S. Pat. No. 3,265,765 to Holden et al, issued Aug. 9, 1966. However, the rubber blends disclosed by Holden et al would appear to be poor candidates for use as the elastomeric base of a pressure-sensitive adhesive (PSA) despite the known utility of the block copolymers in adhesive compositions. First, the marked increase in % elongation reported by Holen et al in Example V of U.S. Pat. No. 3,265,765 strongly suggests that neat and even breaking of a PSA transfer film would be difficult as best if this film contained, as its rubbery base, a blend of the A - B - A block copolymer and polyisoprene or the like. Second, the prior art suggests that the A - B - A block copolymer may reduce permanent tack, i.e., normally aggressive tack, one of the essential properties of a PSA. It is believed that this reduction of tack is possibly an important reason why Harlan, Jr. uses large amounts of oil to plasticize PSA's in which the A - B - A block copolymer is the sole or primary elastomeric component. Compare Grasley, U.S. Pat. No. 3,325,430, issued June 13, 1967, wherein a block copolymer-based sealant composition capable of drying rapidly to a tack-free state is disclosed.

In order to be pressure-sensitive an adhesive, and certainly a pressure-sensitive transfer adhesive, must have a proper four-fold balance of adhesion, cohesion, stretchiness, and elasticity, which permits tapes coated therewith to be aggressively and stably tacky and yet capable of being stripped back from a smooth surface to which temporarily applied without delamination, splitting, or offsetting of adhesive.

Accordingly, this invention contemplates providing a pressure-sensitive adhesive composition containing a reinforcing component to render the composition suitable for transfer film use, wherein the reinforcing component does not detract from, and can even enhance, the delicate four-fold balance of properties described previously.

SUMMARY OF THE INVENTION

Briefly, this invention involves the discovery that marked and unexpected reinforcement of the physical strength of a conventional pressure-sensitive adhesive and proper maintenance of its four-fold balance of properties are obtained by blending minor amounts of certain block copolymers, which can be elastomeric, with the adhesive solids. In the resulting reinforced pressure-sensitive adhesive solids, the major elastomeric component comprises one of the homopolymers or random sequence polymers commonly used in tackified of inherently tacky pressure-sensitive adhesives, e.g. natural rubber, synthetic polyisoprene, styrene-butadiene rubber (SBR), rubbery polyolefins, and the inherently rubbery and tacky acrylate and vinyl ether polymers. The aforementioned block copolymer, though a minor component compared to the rubbery homopolymer or random sequence polymer, has a significant reinforcing effect. The increase in film integrity or physical strength of the adhesive obtained is evidenced by increased tensile strength and is similar to that obtained by the use of fibrous reinforcement, while at the same time avoiding the above-noted disadvantages caused by fiber addition. These block copolymers blend with the pressure-sensitive adhesive (hereinafter referred to as the "PSA") providing homogeneous reinforcement. Unlike fibers, these copolymers are of the same molecular order as the adhesive and uniformly internally reinforce the adhesive without interfering with adhesive properties or coating uniformity. The reinforced PSA's of this invention are normally and aggressively tacky and have high tensile and shear strength and good elastic recovery after deformation; furthermore, the % elongation at rupture for these reinforced PSA's is in a useful range, not excessive for transfer film use, so that neat and even breaking of the transfer film can be readily achieved. The adhesives can readily be formed into thin, uniform coatings or films.

The block copolymers which have been found to provide improved strength are copolymers having 3 or more polymer block structures having a general configuration

A - B - A wherein each A is a thermoplastic polymer block with a glass transition temperature above room temperature having an average molecular weight between about 5,000 and 125,000, and B is a polymer block of a conjugated diene having an average molecular weight between about 15,000 and 250,000. These block copolymers are not used as the elastomeric component of the reinforced PSA's of this invention, but rather as a compatible reinforcing additive for a conventional PSA.

DETAILED DESCRIPTION OF THE INVENTION

Pressure-sensitive adhesives commonly have a rubbery base of natural or synthetic rubbery polymer blended with a tackifier resin. Certain synthetic polymers and copolymers (e.g., certain polyvinyl ethers and polyacrylates) have a molecular structure which is inherently rubbery and tacky and can be employed without addition of a tackifying material. Such adhesives are disclosed, for example, in Ulrich U.S. Patent Re. 24,906 issued Dec. 13, 1960. These viscoelastic rubbery-base pressure-sensitive tape adhesives are more highly cohesive than adhesive, yet they are aggressively tacky in normal dry form at ordinary temperatures.

It has been found in accordance with the present invention that when the above noted block copolymers are added as a minor amount compared to the rubbery base of the PSA (i.e., the inherently rubbery and tacky polymers and/or non-tacky homopolymer or random sequence rubbery polymers), a surprisingly effective internal reinforcement or increase in physical strength of conventional pressure-sensitive adhesives is obtained. Contrary to the results most likely from prior art teachings, this increased strength is obtained with no substantial loss of heat stability, low temperature properties, solvent resistance, or the aforementioned four-fold balance of PSA properties. For example, the reinforced PSA's of this invention are generally characterized by a decrease in % elongation and a high level, or even an enhanced level, of quick tack, sometimes called "quick stick tack" or "probe tack".

The preferred pressure-sensitive adhesives (PSA's) of this invention are obtained by combining about 5 - 30 parts by weight, preferably not more than about 20 parts by weight, of a previously described block copolymer with 100 parts of essential PSA solids, "essential PSA solids" being defined herein as (1) a rubbery base comprising an elastomeric homopolymer or random sequence polymer derived from a plurality of monomeric materials, and (2) a tackifier resin for the rubbery base, if the rubbery base is not inherently tacky. As is well known in the art, the reinforced PSA of this invention, particularly if it is of the conventional rubber-resin type, can contain other conventional ingredients, additives, modifiers, stabilizers, catalysts, etc., which will be described subsequently and which ordinarily include oil soluble, heat-advancing rubber-reactive phenol-aldehyde resins, metal rosinates, antioxidants, and fillers. The total amount of all these additives can be up to about 150 parts per hundred (phr) of rubbery base, but preferably is less than about 50 phr. Plasticizers can be added, but oily materials which degrade internal strength should be kept to a minimum. For the purposes of this invention, however, the required amount of block copolymer additive is determined primarily by the amount of rubbery base or rubbery base + tackifier resin in the PSA which is to be reinforced by the block copolymer additive. As for the block copolymer additive, it has been found that less than an equal amount of block copolymer can be compatible with the rubbery base and can form a single rubbery solid phase; i.e., regardless of the PSA formula used, the A - B - A block copolymer should never exceed 45% by weight of the total elastomeric component of the reinforced PSA composition, preferably not more than 30 wt. % of this elastomeric component. Thus, a typical range of formulations suitable for use in this invention is as follows:

|  | Parts by Weight |
|---|---|
| Rubbery polymer (homopolymer or random sequence polymer derived from plurality of monomers) | 100 |
| Tackifier resins (amount depends in part on inherent tack characteristics of rubbery polymer | 0 - 150 |
| A-B-A Block copolymer reinforcing agent (described previously) | 5 - 30 |
| Other additives, modifiers, etc. | 0 - 50 |

As a general rule, then, the reinforcing component will comprise about 3 - 25 wt. % of the total composition described above, and <45% (about 80 phr), based on rubber alone.

As is well known in the art, PSA's based on inherently tacky rubbery materials (e.g. the acrylate and vinyl ether polymers described previously) do not require any tackifier, although a tackifier can be included, if desired. However, non-tacky rubbery base materials such as natural rubber, synthetic polyisoprene, styrene-butadiene rubber (SBR), and the ethylene-propylene random copolymer rubbers do require tackifier resins. The preferred reinforced "rubber-resin" type of PSA's of this invention are as follows:

|  | Parts by Weight |
| --- | --- |
| Non-tacky rubbery base | 100 |
| Tackifier resins | 25 – 150 |
| A - B - A block copolymer reinforcing agent (described previously) | 5 – 30 |
| Phenol-aldehyde resin and other additives | 5 – 50 |

Stated another way, this preferred formulation is about 5-10 parts of the reinforcing component per 100 parts PSA solids, where the "PSA solids" include non-tacky rubbery base, tackifier resin, the phenol-aldehyde resin, and other conventional additives which are solids at room temperature, e.g. solid catalysts and stabilizers. Surprisingly, in these preferred compositions, and in preferred embodiments of the PSA's based on inherently tacky rubbers as well, an increase in quick tack or "quick stick tack" or "probe tack" over unreinforced PSA's can be obtained. All these quick tack properties involve roughly similar tests wherein a film of the PSA is contacted with a probe having a known area, the probe is removed at a given speed, and force required for removal at that speed is measured; see, for example, Test PSTC-11. An increase in quick tack is totally unexpected in view of the teachings of the art and in view of the tendency of the aforementioned block copolymers to reduce the tack and adhesion characteristics of PSA's. The increased quick tack is normally obtained when less than about 20 parts by weight of the block copolymer reinforcing component are used per 100 parts by weight of non-tacky rubber base or less than 30 parts by weight per 100 parts by weight of inherently tacky (e.g. acrylate) rubber base. That is, to achieve this increased quick tack, the blended rubber component of the PSA should be, in any event, less than about 24 wt. %, preferably no more than 20 wt. %, block copolymer.

It has been found that the aforementioned block copolymer reinforcing agents of this invention strongly affect the four-fold balance of adhesive properties described previously, and the amount of reinforcing additive must be selected according to the teachings of this invention to preserve the proper balance. The tensile strength of the PSA's of this invention has been observed to increase with increasing amounts of reinforcing agent, but the T-peel adhesion has a tendency to decrease. Surprisingly, the % elongation also decreases with increasing block copolymer content. The effect on quick tack has been discussed previously. Thus, the preservation of the four-fold balance achieved with this invention could not be predicted from theoretical considerations and was determined empirically.

In one preferred embodiment of the invention, the conventional pressure-sensitive adhesive used (i.e., an adhesive wherein the molecular structures of any copolymers present are of random sequence, that is, are not block copolymers) is prepared by mixing a rubber with a tackifier resin and a crosslinking or heat advancing agent, such as oil soluble heat reactive phenol aldehyde resins or benzoyl peroxide. The conventional formulation is heated to cause a small amount of cross-linking between the rubber and the resin to occur, thus providing adhesive of very high thermal stability into which minor amounts of block copolymers are added to provide unexpected reinforcement without any appreciable loss of adhesive properties. The conventional rubber-resin pressure-sensitive adhesives thus prepared, even though cross-linked, in themselves are incapable of being formed into a transfer film, because when so formed the resultant film will offset or deform badly upon removal from the liner, whereas the adhesive with a minor amount of block copolymer added has sufficient internal strength to be readily formed into a transfer adhesive, which can be handled and used in a manner previously possible only with fiber reinforced adhesives. An example of the preferred heat crosslinkable adhesives are those disclosed in U.S. Pat. No. 2,410,053 (Drew), issued Oct. 29, 1946. The adhesives disclosed by Drew are compositions comprising rubber, a thermo-softening rubber-compatible resin adapted to produce tack, and a minor proportion of an oil-soluble heat-advancing rubber-reactive phenolaldehyde resin. The adhesive may subsequently be dissolved in a solvent if desired, such as an aromatic hydrocarbon type. If the phenol-aldehyde resin were not employed, the usual sticky, plastic type of rubber-resin cement would result. The reaction of the rubber with the phenol-aldehyde resin firms up the mass, increases the cohesive strength, and results in a reduction of tack.

Fairly wide ranges of proportions can be used. The thermo-softening resin should be in sufficient amount to plasticize the rubber and render it tacky or adhesive. Usually 25 – 150 parts per 100 parts rubber will be found satisfactory. The phenol-aldehyde resin should in general be in minor proportion, less than half the rubber, with 5 – 30 parts per 100 parts rubber being the most useful range.

As suitable examples of thermo-softening rubber-compatible resins, mention is made of rosin, hardened resins (rosin hardened with zinc oxide, lime, magnesia, etc., to form the corresponding resinate, e.g. zinc abietate, calcium abietate, magnesium abietate, respectively), ester gum, hydrogenated rosin, hydrogenated ester gum, damar, copal, coumarone-indene type resins, hydrogenated indene resin (such as "Nevillite"), dihydronaphthalene resin (such as duPont "RH-35", which class of resin is described in Industrial and Engineering Chemistry, Vol. 32, pages 312 – 315), as well as mixtures of two or more of such resins. These resins blend with rubber and promote tack.

The rubber-reactive heat-advancing resins are most commonly formed of para-substituted phenol (such as para tertiary amyl or butyl phenol) reacted with formaldehyde, the latter being substantially in excess of equimolecular amount (preferably 1.5 or more mols formaldehyde per mol of the phenol) with the reaction being performed in the presence of an alkaline catalyst (such as potassium hydroxide), with subsequent neutralization (as with acetic acid). These resins are called "oil-soluble" because they are compatible with drying oils such as are used in the varnish art.

The rubber may be wild rubber, plantation rubber (smoked sheets), latex crepe, reclaimed rubber, scrap rubber, equivalent synthetic or artificial rubber, or combinations thereof. Preferred synthetic rubbers for these rubber-resin adhesives include the SBR, ethylene-propylene, and synthetic isoprene polymers described previously. Another preferred rubber is cis-polybutadiene. Any of the conventional homopolymeric or random sequence polymers can be used in the rubbery base of the PSA's of this invention, but PSA's based on conventional high strength rubbers (e.g. polychloroprene, nitrile rubbers, and chlorosulfonated polyethylene) do not benefit from reinforcement as much as the preferred PSA's.

The reaction between the rubber and phenolaldehyde resin is preferably performed in the presence of a catalyst to speed the reaction and permit use of low temperatures.

Examples of catalysts are metal resinates and naphthenates, such as those of zinc, lead, cobalt and aluminum, and also the oxides of such metals. Thus, zinc oxide may be used, though when used in conjunction with a reaction mixture containing rosin (for example) it reacts with the latter to form zinc abietate and this resinate will in such case perform as a catalyst. Only a small amount of catalyst is needed to produce marked results.

Various fillers can be added if desired, as well as modifying agents such as softeners or plasticizers. One or more rubber antioxidants may be included.

Adhesives having similar properties can be prepared from acrylic copolymers which are cross-linked by reaction with a polyfunctional organic compound, as taught in U.S. Pat. No. 2,925,174 (Stow), issued Feb. 16, 1960. More specifically, Stow discloses combining (1) a copolymer of monomers comprising (a) monomeric acrylic acid ester of non-tertiary alkyl alcohol, the molecules of which alkyl alcohol have from 1 to 14 carbon atoms, the average being about 4 to 12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky stretchable and elastic adhesive polymer mass, and (b) at least one copolymerizable monoethylenic monomer containing, bonded to an ethylenic carbon, at least one strongly polar group attached through a carbonyl radical, the total copolymerizable monomer (b) comprising about ½ to 12 percent by weight of the total of said monomers (a) and (b); and (2) a mutually miscible non-metallic polyfunctional organic compound of primarily carbon-to-carbon skeletal chain, said compound having at least two groups readily reactive to form primary bonds with the strongly polar group of said monoethylenic monomer, the ratio of said reactive groups in the polyfunctional compound to atoms other than hydrogen in the compound, excluding atoms in the reactive groups, extending from about 1:1 to about 1:50.

The preferred block copolymers for use in the adhesives of the present invention are block copolymers of three or more blocks having the general configuration

- A - B - A - wherein the polymer blocks A are plastic polymer blocks which, as homopolymers have glass transition temperatures above 20° C., while the blocks B are elastomeric polymer blocks derived from at least one conjugated diene such as butadiene or isoprene.

The choice of species and molecular weights of each of the individual blocks of these block copolymers is based upon properties obtained by utilizing block copolymers having the limitations now to be described. While the specific molecular weights of the elastomeric blocks prepared from the conjugated diene and the plastic blocks may be varied for specific end uses, it is preferred that the elastomeric blocks have an average molecular weight from about 15,000 to about 250,000, and that the plastic blocks prepared from vinyl arene comprise 20 – 80% by weight of the entire block copolymer, the individual molecular weights of these plastic blocks being coordinated for this purpose with the average molecular weight of the elastomeric blocks.

The non-elastomeric or plastic blocks are those having average molecular weights between about 5,000 and 125,000. These blocks are prepared by polymerization of vinyl monomers and/or acrylic monomers and should have glass transition temperatures above about 20° C., the difference in glass transition temperature between that of elastomeric blocks and of the plastic blocks being greater than about 100° C. If the glass transition temperature of the elastomeric blocks and plastic blocks respectively are in an area substantially less than this limit, the desirable reinforcing properties are not provided.

The non-elastomeric blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene, as well as dicyclic monovinyl compounds such as vinyl naphthalene and the like. Other non-elastomeric polymer blocks may be derived from alpha olefins, alkylene oxides, acetals, urethanes, etc.

The elastomeric blocks are prepared from conjugated dienes such as isoprene, butadiene, copolymers of styrene and butadiene, as well as their homologues. The method for preparation of these block copolymers is shown in the above noted U.S. Pat. No. 3,239,478 (Harlan, Jr.) issued Mar. 8, 1966.

The invention will be further explained with reference to the following examples in which all parts are given by weight, unless otherwise indicated.

EXAMPLE I

The following ingredients were mixed together and then heat cured in a Mogul mixer at about 240° F. for about 20 minutes:

| Part A | |
|---|---|
| | Parts |
| Natural rubber (masticated crepe) | 100 |
| Heat treated wood rosin | 20 |
| Polyterpene resin (115° C., R. & B. softening point) | 40 |
| Zinc rosinate | 5 |
| Oil soluble, heat reactive phenol-aldehyde resin | 12 |
| Antioxidant, 4,4'-thio-bis (6-tertiary butyl cresol) | 2 |

The mixture was then quenched and diluted to 34% solids by adding heptane.

The following ingredients are separately mixed at room temperature and then added and mixed into the heat cured adhesive formulation:

| Part B | |
|---|---|
| | Parts |
| Block copolymer of styrene and butadiene<br>1 polymer block 70,000 molecular weight butadiene,<br>2 polymer blocks 15,000 molecular weight styrene (Shell Kraton 101) | 17 |
| Tackifier (pentaerythritol ester of rosin) | 10 |
| Solvent (heptane) | 101 |

The adhesive composition was then knife coated onto a silicone treated paper releast liner to a dry thickness of 1.8 mils. A control adhesive was also prepared by using the heptanediluted heat-cured formulation without addition of the block copolymer. The control was similarly formed into a film on a release liner. The control adhesive could not be wound into a roll and unwound without random transfer of the adhesive from the release liner, whereas the adhesive containing the block copolymer could be unwound without transfer as a self-sustaining integral film.

Adhesive formulations were also prepared by adding Kraton 101 (without the additional pentaerythritol ester of rosin tackifier) to the above conventional rubber-resin adhesive in various amounts. The adhesives were formed into a transfer film by coating on a release liner to a wet thickness of 0.007 inch. The films were dried in an oven to produce dry films having a thickness of 0.002 inch. The physical properties of the films were measured and are summarized as follows:

| Weight percent Kraton 101 | Tensile strength, p.s.i. | % Elongation at rupture | 180° peel* ASTM test D-1000 oz/in. | % Permanent set** after elongation of 200% for 10 sec. |
|---|---|---|---|---|
| 0 | 30 | 550 – 700 | 49 | 12.5% |
| 7.67 | 45 | 475 – 600 | 43 | 3.1% |
| 15.3 | 55 | 450 – 550 | 39 | about 1 % |
| 23.0 | 65 | 425 – 500 | 36 | about 1 % |

*measured by laminating the transfer adhesive liner combination to a 1 mil polyester film, removing the liner, and testing the resulting film-adhesive tape.
**double thickness film used in tests.

EXAMPLE II

| | Parts (dry) |
|---|---|
| A copolymer isooctyl acrylate-acrylamid (wt. % ratio of 96–4) as a 25% solution in ethyl acetate and heptane | 100 |
| Kraton 101 (see Ex. I), 25% solution in heptane | 10 |

When mixed together and coated on 1.8 mils dry film thickness on release liner, the material had the following properties:

| Material | Permanent set after 200% elongation for 10 sec. | Tensile strength, p.s.i. | % Elongation at rupture | 180° peel adhesion ASTM test D-1000, oz/in. |
|---|---|---|---|---|
| Example II | 5.0% | 244 | 670 | 31 |
| Control (without Kraton) | 10.0% | 137 | 1760 | 37 |

When permanent set was measured, it was noted that the film with additive showed recovery to a smooth flat film, while the control was badly curled at the edges.

EXAMPLE III

The following ingredients were mixed and heat cured in a Mogul mixer as in Example I, the solvents being added subsequently:

| | |
|---|---|
| Natural rubber (latex crepe) | 100 |
| Polyterpene resin | 60 |
| Zinc rosinate | 10 |
| Tricresyl phosphate | 5 |
| 2,5-di-tert-amylhydroquinone | 1 |
| Oil soluble, heat reactive phenol-aldehyde resin | 12 |
| Ethanol | 20 |
| Toluene | 20 |
| Heptane | 396 |

The following ingredients were separately mixed:

| | |
|---|---|
| Kraton 101 (see Ex. 1) | 100 |
| Tackifier (pentaerythritol ester of rosin) | 75 |
| Heptane | 525 |

400 parts by weight of the block copolymer mixture were added to 800 parts of the rubber-resin adhesive to form an internally reinforced adhesive.

The strength of the rubber-resin adhesive with and without the reinforcing block copolymer was compared by knife coating each on conventional crepe paper masking tape backing to a thickness of about 2 mils. Two ½ inch wide strips of each tape were overlapped ½ inch, adhesive to adhesive; one free end of the resultant spliced tape pieces was secured to a jaw, and the other end had attached thereto a 1750 gram weight suspended therefrom. The time for the adhesive juncture to fail was recorded: adhesive without the block copolymer failed in 46 minutes, whereas that containing the the block polymer failed in 814 minutes, thus displaying greatly improved strength.

EXAMPLE IV

(1) Rubber-Resin PSA's

The same formulation of Part A of Example I was mixed and diluted with solvent as in Example I, except that the dilution was to 21.7% instead of 34% solids. To this solution a 25% solids solution in toluene of the "Kraton" of Example I was added in the correct proportions to yield 0 (control), 6.25, 12.5, 18.75, 25, 33, and 50 dry parts of the "Kraton" per each 100 parts of dry adhesive solids. These proportions provided, respectively, 0, 11.8, 23.6, 35.4, 47.3, 62.5, and 95 parts of the "Kraton" per each 100 parts of the natural rubber component of Part A. Films of the resulting combined solution were cast onto polyester film using a Gardner knife with a 10 mil orifice, and the films were allowed to dry. After drying, the films were inspected and the first four samples were uniform and compatible in appearance. The sample containing 25 parts of the "Kraton" additive showed very slight incompatibility as demonstrated by the fact that the dried coatings on the films were lightly streaked with hazy areas. The 50 parts of "Kraton" additive in the last film were incompatible as shown by the general over-all haziness and streaking, and by the adhesion properties the coated film displayed. In this context, the term "incompatible" refers to phase separation effects which are generally undesirable in pressure-sensitive adhesive compositions.

(2) Acrylate PSA's

A second group of pressure-sensitive adhesive compositions were made by mixing 47 grams of a 21.3% solids solution of the acrylate adhesive of Example II with 5, 10, and 20 grams of the same "Kraton" used in the first part of this Example. In each case, 15 grams of ethyl acetate solvent was also added. A control of straight Example II adhesive without "Kraton" was also provided. These mixtures yielded "Kraton" additive levels in the dry state of 0, 12.5, 25, 33 and 50 parts "Kraton" additive per 100 parts of the acrylate. Ten mil (wet thickness) coatings were cast on polyester film as in Part (1) and allowed to dry over night at room temperature. This technique yielded dry adhesive tapes with the adhesive portion ranging in thickness between 0.5 and 0.9 mils.

(3) Probe Tack Test

Samples of the coated films made according to Parts (1) and (2) of this Example, each sample bearing 10 grams of weight, was contacted and lifted by a probe with an area of 0.316 cm$^2$ for a period of two seconds. The force to remove the probe at a transverse speed of 2.54 cm/min was measured, and the values were recorded. According to this test, a value of greater than 200 grams has a distinctly tacky feel when a finger comes in contact with the adhesive surface, an effect commonly known in the art as "thumb appeal". A value of greater than 125 grams has some "thumb appeal", but values below 125 grams tend to be deficient in this respect. A value less than about 90 grams would not be commercially acceptable as a pressure-sensitive adhesive.

A tabulation of the quick tack, i.e., probe tack or "quick stick tack" values and observations of compatibility for the various amounts of "Kraton" (block copolymer reinforcing agent) are given below, wherein parts per hundred by weight is abbreviated as "PHR";

Table 1

Results obtained According to Part (1) of Example IV

| Amount of Block Copolymer in PHR | | Probe Tack | |
|---|---|---|---|
| Basis: Total Part A solids (see Ex. I) | Basis: Part A Rubber (see Ex. I) | Value (grams) | Compatibility |
| None | None | 235 | — |
| 6.25 | 11.8 | 590 | no phase separation |
| 12.5 | 23.6 | 190 | no phase separation |
| 18.75 | 35.4 | 155 | no phase separation |
| 25.0 | 47.3 | 115 | very slight phase separation |
| 33.0 | 62.5 | 90 | very slight phase separation |
| 50.0 | 94.5 | 50 | incompatible |

Table 2

Results Obtained According to Part (2) of Example IV

| Amount of Block Copolymer in PHR | Probe Tack | |
|---|---|---|
| Basis: Acrylate Polymer Solids | Value in Grams | Compatibility |
| None | 265 | Clear |
| 12.5 | 570 | Very slightly hazy |
| 25.0 | 325 | Very slightly hazy |
| 33.0 | 120 | Very slightly hazy |
| 50.0 | 35 | Incompatible |

In the preceding tables, parts per hundred (PHR) can be converted to weight-% in the usual manner to illustrate the percentage ranges of 0 – 33.3% of total solids or 0 – 48.5% of the total blended rubber (natural rubber + block copolymers) component of Part (1).

The data of Tables 1 and 2 can be compared to Examples I – III by consulting the following table:

| | PHR of Block Copolymer Additive ("Kraton") | |
|---|---|---|
| Example | Basis: Total Solids | Basis: Rubber |
| I | 9 (8.25 wt. %) | 17 (14.5 wt. %) |

-continued

| | PHR of Block Copolymer Additive ("Kraton") | |
|---|---|---|
| Example | Basis: Total Solids | Basis: Rubber |
| II | 10 (9.1 wt. %) | 10 (9.1 wt. %) |
| III | 22.2 (18.1 wt. %) | 50 (33.3 wt. %) |

EXAMPLE V

Reinforced Rubber-Resin Mixtures

In this Example, the reinforcing effect of an A-B-A type block copolymer is investigated with respect to various synthetic rubbery polymers. The selection of rubbery polymers (or, using an equivalent term of art, "elastomers") was made according to the American Society for Testing and Materials (ASTM) definition: an elastomer is a material which at room temperature can be stretched repeatedly to at least twice its original length and upon immediate release of the stress will return with force to substantially its original length. All of the synthetic rubbers selected for the following formulations have insufficient normal or permanent tack for use in pressure-sensitive adhesives and therefore were blended with conventional tackifiers.

The A-B-A type block copolymer used was a seven block (A-B - A-B-A - B-A) styrene-isoprene copolymer wherein each of the four A blocks were 12,000 molecular weight plastic polystyrene blocks and each of the three B blocks were 18,000 molecular weight polyisoprene blocks. These B blocks, as homopolymers, are "elastomeric" in the sense of the ASTM definition.

The general formulation tested was as follows:

| Component | Parts by Weight (dry) |
|---|---|
| Synthetic rubber | 100 |
| 7-block styrene/isoprene polymer | 15 |
| Tackifier | 100 |

Each formulation was prepared by diluting the 100 parts of rubber with solvent to 25 wt. % solids, diluting the 15 parts block copolymer to 20 wt. % solids, mixing the two solutions, and adding the 100 parts dry tackifier to the combined solution. (For laboratory scale formulations, this procedure was conveniently carried out on the basis of 0.1 gram = 1 part.). For convenience, the usual heat-reactive phenol-aldehyde resin curatives, catalysts, antioxidants, etc. were omitted, but these can easily be added to the formulations by following the teachings of this invention, e.g. Example I.

Several samples of the above general formulation were made up with various synthetic rubbers and a suitable tackifier. Adhesive characteristics were evaluated by measuring 180° peel (ASTM test D-1000) and a standard shear time test, wherein two half inch wide coated strips were overlapped 1-half inch, adhesive-to-adhesive, one free end of the resultant spliced tape pieces was secured to a jaw, and the other end attached to a 1,000 gram weight such that the weight was suspended from the spliced tape pieces until failure of the adhesive bond. The results are recorded in Table 3, wherein the following abbreviations are used: "SBR" for styrene-butadiene random copolymer rubber, and "EPR" for ethylene-propylene random copolymer rubber, herein a terpolymer with some diolefin units.

Table 3

|     | Rubber | Tackifier | ASTM D-1000 (oz./in.) | Shear time (minutes) |
| --- | --- | --- | --- | --- |
| (A) | SBR | Polyterpene | 29 | 22.9 |
| (B) | Polyisoprene | Polyterpene | 33 | 62.7 |
| (C) | EPR* | Polyterpene* | 46 | 31.6 |
| (D) | Neoprene | Oil soluble phenolic | No peel resistance | >4200 |
| (E) | Chlorosulfonated polyethylene | Rosin derivative | Negligible peel resistance | 96.4 |

*Formulation prepared as described previously except that the 100 parts EPR were diluted to a 20 wt. % solution.

Notes on Table 3
(A) The SBR used: "FRS-1004" of Firestone Tire & Rubber Co. The polyterpene: "S-1010" of Hercules Co.
(B) The polyisoprene: Synthetic high-cis content polyisoprene ("Natsyn 400") The Polyterpene: See (A).
(C) The EPR contained 55% ethylene units + propylene and diolefin. The polyterpene: See (A).
(D) The neoprene (polychloroprene) used: "Neoprene W" of duPont. The oil soluble phenolic resin was used only as a tackifier, not a curative. ("CKR-1634").
(E) This chlorosulfonated polyethylene: "Hypalon 20" (duPont). The rosin tackifier: "Staybelite" (Hercules Co.)

For comparison, the above general formulation was tested with nitrile rubber ("Hycar 1001") and crude (uncured) rubber. The nitrile rubber sample, tackified with "CKR-1634", was generally unsatisfactory. The crude rubber sample, tackified with "S-1010", had a peel resistance of 42 oz/in and a shear time of only about 1.3 minutes. In a further comparison, the tests on an EPR sample were repeated but with the block copolymer additive omitted from the formulation. The observed peel resistance was good (72 oz/in.), but the shear time was drastically reduced (5.6 minutes).

What is claimed is:

1. A thin, self-supporting, tacky, clean-breaking, pressure-sensitive adhesive transfer film including an internal reinforcing polymer additive, said film having a thickness of up to about 2 mils and comprising the following admixed components:
   (1) a crosslinked, tackifiable rubbery polymer having properties suitable for use in a rubber-resin adhesive, said tackifiable rubbery polymer being a homopolymer or random sequence polymer,
   (2) a tackifier resin component capable of imparting aggressive tack to said tackifiable rubbery polymer, and
   (3) 5 – 30 parts by weight, per 100 parts of the total weight of components (1) and (2), but in no event more than about 80 parts by weight per 100 parts by weight of said component (1), alone, of a block copolymer reinforcing component, said block copolymer reinforcing component being compatible with said components (1) and (2) and comprising at least three polymer blocks of the type

- A - B - A - wherein each A is a plastic polymer block, which, as a homopolymer, has a glass transition temperature above 20° C., the average molecular weight of each block A being between about 5,000 and about 125,000; B is a polymer block of a conjugated diene, the average molecular weight of each block B being between about 15,000 and about 250,000; the total blocks A being less than about 80% by weight of the block copolymer.

2. A pressure-sensitive adhesive transfer film roll comprising a release liner having a transfer film according to claim 1 thereon, said film and said liner being in wound roll form and capable of being unwound without offsetting of the adhesive.

3. A thin, self-supporting, tacky, clean-breaking, pressure-sensitive adhesive transfer film including an internal reinforcing polymer additive, said film having a thickness of up to about 2 mils and comprising the following admixed components:
   (1) an inherently rubbery and tacky synthetic random sequence polymer containing acrylate or vinyl ether units,
   (2) 5 – 30 parts by weight, per 100 parts by weight of component (1), of a block copolymer reinforcing component, said block copolymer reinforcing component being compatible with said component (1) and comprising at least three polymer blocks of the type

- A - B - A - wherein each A is a plastic polymer block, which, as a homopolymer, has a glass transition temperature above 20° C., the average molecular weight of each block A being between about 5,000 and 125,000; B is a polymer block of a conjugated diene, the average molecular weight of each block B being between about 15,000 and about 250,000; the total blocks A being less than about 80% by weight of the block copolymer.

4. A pressure-sensitive adhesive transfer film roll comprising a release liner having a transfer film according to claim 3 thereon, said film and said liner being in wound roll form and capable of being unwound without offsetting of the adhesive.

5. A transfer film according to claim 1 wherein said crosslinked, tackifiable rubbery polymer is selected from the group consisting of natural rubber, random sequence styrene-butadiene polymer, random sequence ethylene-propylene polymer, synthetic polyisoprene, high cis-content polybutadiene, and mixtures thereof.

6. A pressure-sensitive adhesive transfer film roll comprising a release liner having a transfer film according to claim 5 thereon, said film and said liner being in wound roll form and capable of being unwound without offsetting of the adhesive.

* * * * *